(12) United States Patent
Migliori

(10) Patent No.: US 7,836,813 B2
(45) Date of Patent: Nov. 23, 2010

(54) SELF-LOCKING BRAKING DEVICE FOR ROTARY SHAFTS, AND RELEVANT APPLICATIONS

(75) Inventor: Luciano Migliori, Milan (IT)

(73) Assignee: Univer S.p.A., Milan (IT)

( * ) Notice: Subject to any disclaimer, the term of this patent is extended or adjusted under 35 U.S.C. 154(b) by 1071 days.

(21) Appl. No.: 11/582,454

(22) Filed: Oct. 18, 2006

(65) Prior Publication Data

US 2007/0084684 A1    Apr. 19, 2007

(30) Foreign Application Priority Data

Oct. 19, 2005    (IT)    .......................... MI2005A1983

(51) Int. Cl.
B25B 5/12    (2006.01)
F15B 15/26    (2006.01)
(52) U.S. Cl. .............................. 92/17; 92/28
(58) Field of Classification Search ................. 91/404; 92/17, 23, 26, 28; 188/170
See application file for complete search history.

(56) References Cited

U.S. PATENT DOCUMENTS 2,710,595 A * 6/1955 Peterson et al. ............... 91/394

| | | | |
|---|---|---|---|
| 6,009,981 A | 1/2000 | Wolfe | |
| 6,178,870 B1 | 1/2001 | Takahashi | |
| 6,412,612 B1 * | 7/2002 | Parsons | 188/170 |
| 6,752,066 B2 * | 6/2004 | Varetto et al. | 92/17 |

FOREIGN PATENT DOCUMENTS

| | | |
|---|---|---|
| EP | 0 469 253 | 2/1992 |
| EP | 0 648 942 | 4/1995 |
| EP | 648942 A1 * | 4/1995 |
| EP | 1 253 004 | 10/2002 |
| EP | 1398115 A2 * | 3/2004 |
| GB | 2 009 850 | 6/1979 |
| GB | 2 154 282 | 9/1985 |
| WO | WO 98/05879 | 2/1998 |

* cited by examiner

*Primary Examiner*—Thomas E Lazo
(74) *Attorney, Agent, or Firm*—Young & Thompson

(57) ABSTRACT

A self-locking braking device, for rotary shafts connectable to external loads, comprises braking means which can be operated to lock, respectively to release the rotation of a drive shaft; the braking means consist of a rigid braking disk, rotating with the drive shaft, and slidingly supported in an axial direction between two clutch members, one of which is secured to a support body for the drive shaft, while the other clutch member is supported by a plate which is elastically biased against the braking disk and operatively connected to a pneumatic cylinder for releasing the brake.

8 Claims, 3 Drawing Sheets

SELF-LOCKING BRAKING DEVICE FOR ROTARY SHAFTS, AND RELEVANT APPLICATIONS

BACKGROUND OF THE INVENTION

The present invention concerns a self-locking braking device for rotary shafts, which are connectable to external loads movable between different operative positions. The invention also refers to possible applications of the self-locking braking device, for example for use in pneumatically operated linear actuators, and in drive devices having working swing arms, or for other applications.

STATE OF THE ART

The use of self-locking braking devices, in linear actuators, is shown for example in EP 0 469 253, GB 2 009 850 and GB 2 154 282.

According to EP 0 469 253, which is regarded as the closest prior art with respect to this invention, the self-locking braking device, shown therein, comprises a braking member made of elastomeric material, axially and rotationally connected to a drive shaft; the braking member can be gripped between two clutch members, one of which stationary and the other axially movable to be biased by a pack of Belleville washers towards and against the same braking member and the stationary clutch member. The piston of a pneumatic cylinder is operatively connected to the movable clutch member to return it to a position in which it releases the braking member, counteracting the biasing springs.

Even though this braking device has given good results, for certain applications in which the external loads exert considerable forces, or whenever it is necessary to withstand high inertial forces, the known device has proved to be somewhat unsuitable or lacking in efficiency, due to its conformation and the elastic nature of the braking member.

It was noted, in fact, that under severe working conditions, a braking member made of elastomeric material, due to its elastic deformation, is liable to undergo considerable torsional deformation which may cause vibrations and hunting of the shaft in the locked condition, due to the inertial forces of the external loads, with consequent inaccurate positioning, or damage to the device or to the same load to be controlled.

The same elastomeric material of the braking member, when subjected to considerable stress, can also undergo rapid wear, and in many cases is unable to provide a sufficiently high locking force.

In certain applications, for example in pneumatic actuators and/or in devices used for driving and/or for shifting considerably heavy loads, it is also necessary to make use of efficient and reliable drive systems, capable of ensuring an extremely precise locking action under given working conditions.

In particular in the automotive field, along car assembly lines, it is important to be able to use actuating systems and/or drive devices having swing arms capable of moving heavy support structures for several clamping devices for clamping metal sheets to be welded during the assembling of the bodywork parts of a motor vehicle, while maintaining said support structure firmly blocked in a precise position.

OBJECTS OF THE INVENTION

The main object of this invention is to provide a self-locking braking device, for rotary shafts, capable of overcoming the aforementioned problems.

In particular, an object of the invention is to provide a braking device, as mentioned previously, whereby it is possible to move and accurately position external loads, even of considerable weight, avoiding problems relating to possible vibrations and/or hunting of the same load.

A still further object of the invention is to provide a self-locking braking device capable of exerting high clamping forces, and at the same time limiting the problems of wear.

A still further object is to provide a braking device of the aforementioned kind, capable of compensating any unbalance of a moving load.

A further object of the invention is to provide a pneumatic actuator and a drive device provided with a self-locking braking device capable of generating a flywheel effect, as well as with a pneumatic damping system capable of ensuring even movement and controlled stopping of a load, and maintaining the load firmly blocked in different positions.

BRIEF DESCRIPTION OF THE INVENTION

The aforementioned objects can be achieved by means of a self-locking braking device for rotary shafts comprising:

a support body for a rotatably supported drive shaft, the drive shaft being operatively connectable to an external load;

braking means operatable to lock, respectively to release the rotation of the drive shaft, the braking means comprising a braking member rotating with the drive shaft, the braking member being interposed between a first clutch member secured to the support body, and a second clutch member carried by an axially movable support element, the support element of the second clutch member being connected to the piston of a pneumatic cylinder; and biasing spring means between said support element for the second clutch member and the support body for the drive shaft, said biasing spring means being shaped and arranged to lock the braking member and keep it locked between said clutch members, wherein said braking member is in the form of a rigid disk conformed with friction surfaces on both sides; and wherein said braking disk is slidingly supported in an axial direction by the drive shaft, in a floating condition between the two clutch members.

Further features and applications of the invention are defined by the remaining claims.

BRIEF DESCRIPTION OF THE DRAWINGS

The self-locking braking device according to the invention and several of its possible applications are illustrated in greater detail hereunder, with reference to the examples of the figures, in which.

DETAILED DESCRIPTION OF THE BRAKING DEVICE

Figure 1:
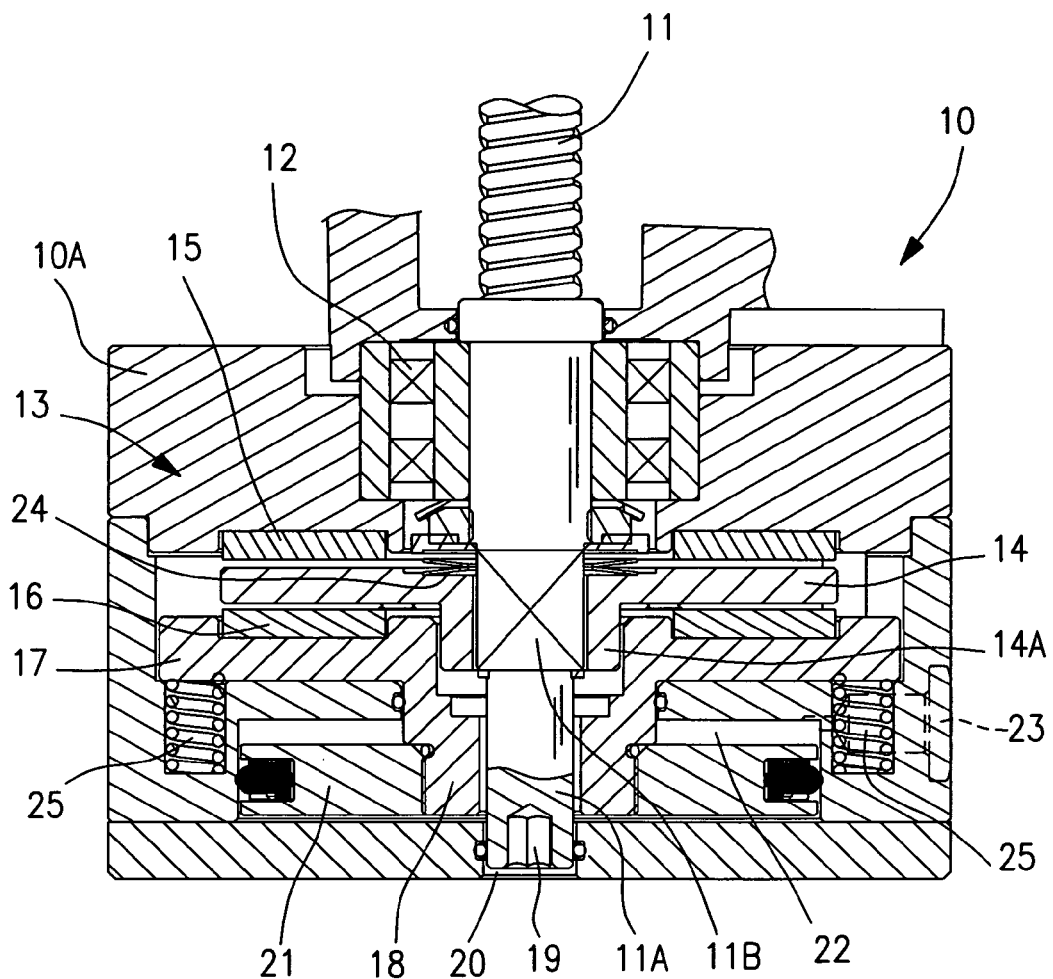
FIG. 1 shows a sectional view of the braking device according to the invention.

In FIG. 1, the reference number 10 has been used to indicate, as a whole a preferential embodiment of a self-locking braking device, according to the invention.

The braking device 10 comprises a body 10A, made in several parts, for supporting a rotary shaft 11 which can be operatively connected to an external load, not shown; the shaft 11 is rotatably supported by the body 10A by means of one or more bearings 12 of an axial and radial type, as shown schematically, and can be made to rotate by any actuator.

The drive shaft 11 is operatively connected to a self-locking braking device arranged within the body 10A, indicated as a whole by reference number 13.

The braking device 13 is substantially composed of a rigid braking member 14, for example a flat disk made of metal or other suitable material, capable of rotating with the shaft 11; the disk 14 is interposed between a first clutch member 15, consisting for example of a flat annular element made of a material having a high friction coefficient, and a second clutch member 16, wholly identical to the first.

The first clutch member 15 is stationary, being for example glued onto an internal surface of the body 10A, while the second clutch member 16 is carried by a movable plate 17, provided with a hub 18 sliding axially on the rear end 11A of the drive shaft 11, without possibility of rotating.

The rear end 11A of the drive shaft is provided with a hexagonal hole 19 accessible from the outside, through a hole 20 in a bottom plate of the body 10A, for a possible manual operation of the shaft 11, wherever required.

From the same FIG. 1, it can be seen that a piston 21 of a single-acting pneumatic cylinder 22 is secured to the hub 18 of the plate 17, in a backward position with respect to the braking device 13.

Pressurised air can be fed into the chamber of the cylinder, through a feed inlet 23; in this way the assembly formed by the piston 21 and by the support plate 17 for the second clutch member 16, can be made to move backwards and maintained in this condition, shown in the figure itself, in which the intermediate braking member 14 is free to move axially and to rotate with the shaft 11, since it is not retained in any way by the two clutch members 15 and 16.

More precisely, the braking member 14 is provided with a hub 14A which fits onto a square seat 11B on the shaft 11, so as to be carried into rotation by the latter, and at the same time allowing a substantially floating condition between the two clutch members 15 and 16, during rotation and a slight axial movement for the locking.

Belleville washers 24, or other elastically yielding spacing means, are interposed between the braking member 14 and the body 10A on the side opposite that of the pneumatic cylinder, to maintain the braking member detached from the first clutch member 16 when the plate 17 is moved backwards, so as to enable the rotation of the same braking member, regardless of the vertical or horizontal position of the device.

The braking member 14, in the form of a rigid flat disk shown in the example, has appropriately roughened or treated side surfaces designed to come into contact with the clutch members, in order to increase the frictional forces; moreover, the braking disk 14 is also made in the form of a flywheel capable of accumulating and releasing kinetic energy, so as to dynamically compensate any unbalances of the external load connected to the shaft 11.

Lastly, reference number 25 in FIG. 1 has been used to indicate biasing springs, consisting for example of helical springs housed in appropriate housings in the body 10A, between the latter and the plate 17, on the side opposite that of the clutch member 16. The springs 24, appropriately preloaded with a pre-established force, are counteracting with respect to the pneumatic cylinder 22, and, when the latter is deactivated, act to axially move the plate 17 with the clutch member 16 and the braking disk 14, towards and against the first clutch member 15, firmly locking the braking disk on both sides to stop the rotation of the shaft 11.

To deactivate the brake, it is necessary once again to feed pressurised air into the chamber of the cylinder 22, to move back the piston 21 overcoming the reaction of the springs 25, thereby releasing the rotation of the braking disk 16; this condition can be maintained by keeping pressurised air in the cylinder 22.

The disposition of the spring members 25 and the pneumatic cylinder, as well as the shape and disposition of the clutch and braking members may be different and/or modified with respect to those shown, still holding the general features of the braking device, as mentioned previously.

Application to a Pneumatic Actuator

Figure 2:
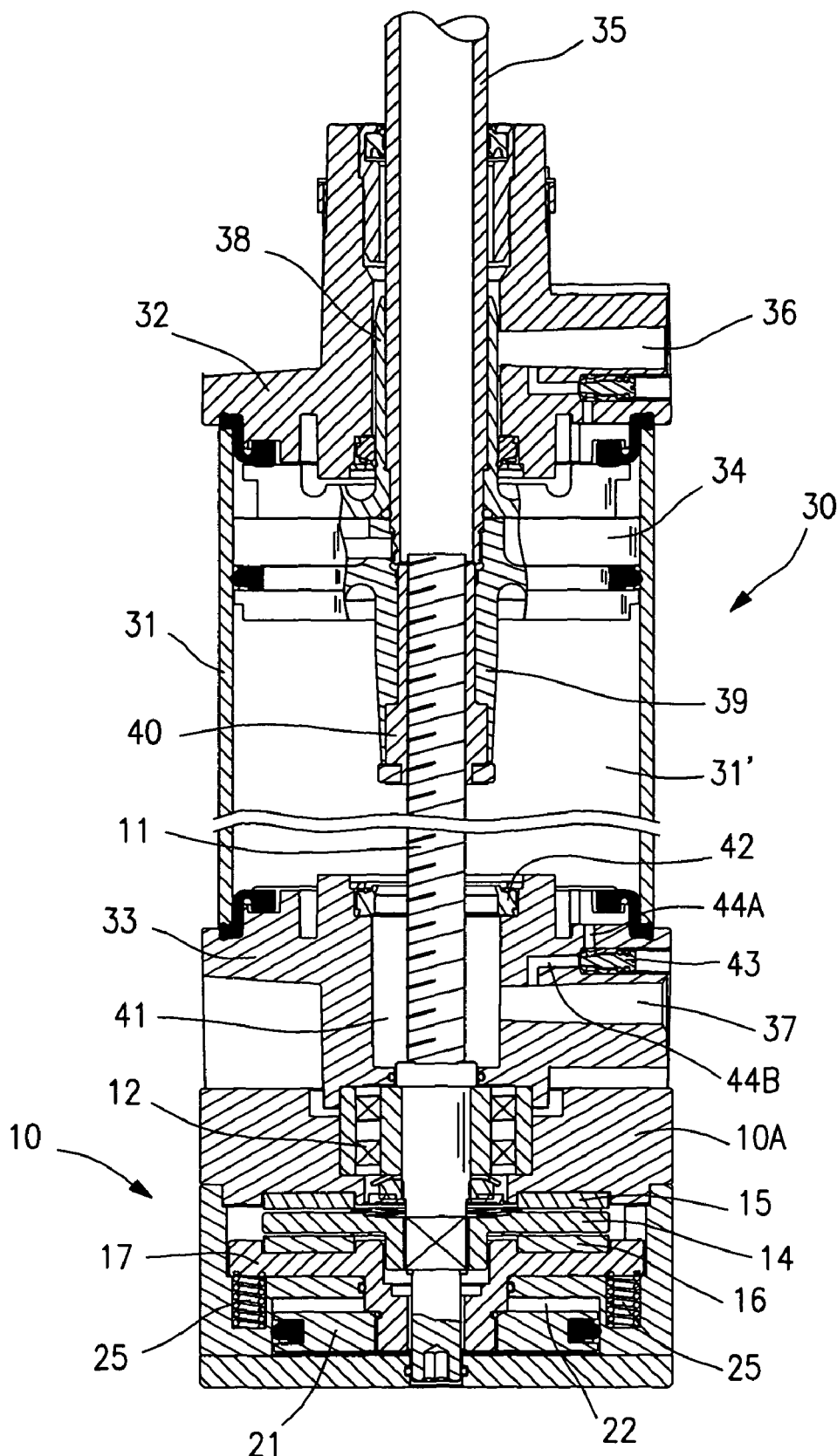
FIG. 2 shows a pneumatic actuator provided with the braking device of FIG. 1.

FIG. 2 of the drawings shows, also by way of example, the application of the self-locking braking device of FIG. 1 to a pneumatic actuator of the linear type; in FIG. 2 the same reference numbers have been used to indicate similar or equivalent parts to those of the braking device 10 of FIG. 1.

As shown, reference number 30 has been used to indicate a linear pneumatic actuator operatively connected to a self-locking braking device 10, of the type shown in FIG. 1.

The cylinder 30 comprises a tubular body 31 closed by a fore head 32 and by a rear head 33 onto which the braking device 10 is mechanically secured.

Reference number 34 has been used to indicate a piston reciprocably movable within the chamber of the cylinder 30 between a backward position against the rear head 33, and a forward position against the fore head 32.

The piston 34 is provided with a tubular rod 35 designed to be connected directly or indirectly to an external load; the rod 35 tightly protrudes from the fore head 32. Reference number 36 has been used to indicate an air duct for feeding and discharging the pressurised air, made in the fore head 32, while reference number 37 has been used to indicate an air duct for passage of the air in the rear head.

The piston 34 has a fore tubular nose 38, coaxial to the hollow rod 35, and a rear tubular nose 39 coaxial and communicating with the fore nose through an axial hole in the piston 34; the two noses 38 and 39 form part of a pneumatic damping device described further on.

Secured inside the rear nose is a nut screw 40 which engages with a single-threaded or multiple-threaded shaft 11, of the reversible type; during the reciprocating movement of the piston 34, the shaft 11 is made to rotate rapidly when the braking device 10 is released.

Conversely, as mentioned previously, when the braking device 10 is locked, the rotation of the threaded shaft 11 is stopped, preventing any movement of the piston 34 and the load connected to it. In the absence of pressurised air in the cylinder 22, the piston 34 of the actuator 30 remains in a permanently locked condition, due to the thrust exerted by the springs 25 on the braking and clutch members, thereby eliminating any consumption of energy.

As mentioned previously, the two noses 38 and 39 form part of a pneumatic damping system for damping the movement of the piston 34 at the two ends of its working stroke.

As schematically indicated for the rear head 33, the nose 39 has an end surface which is slightly conical, in order to penetrate into a cavity 41 coaxial to the threaded shaft 11, the cavity having an open end towards the chamber 31' of the actuator; a lip seal 42 tightly closes the cavity 41 as soon as the conical end of the nose 39 begins to penetrate, closing the passage of the air towards the air duct 37.

In this condition, the pressurised air remaining in the chamber 31' of the cylinder can be discharged through a throttle valve 43, in a duct 44A, 44B made in the head 33, between the chamber 31' of the actuator and the duct 37 for feeding and discharging the pressurised air.

The damping device of the fore head 32 is wholly identical to that of the rear head 33, to which consequently reference is made.

Application to a Drive Device Having a Swing Arm

In certain fields, for example in the automotive manufacturing industry, there is a need to make use of drive devices having swing arms for moving heavy loads, for example for moving and rotating large frameworks supporting the necessary equipment for clamping and welding the metal parts and/or sheet metal parts of a bodywork of a motor vehicle, along an assembly line.

In these applications, it is necessary not only to have rugged drive devices, capable of exerting the necessary forces for moving heavy loads, but also to obtain accurate and precise positionings, and to maintain them firmly and securely for the necessary period of time, with a minimum consumption of energy.

Figure 3:
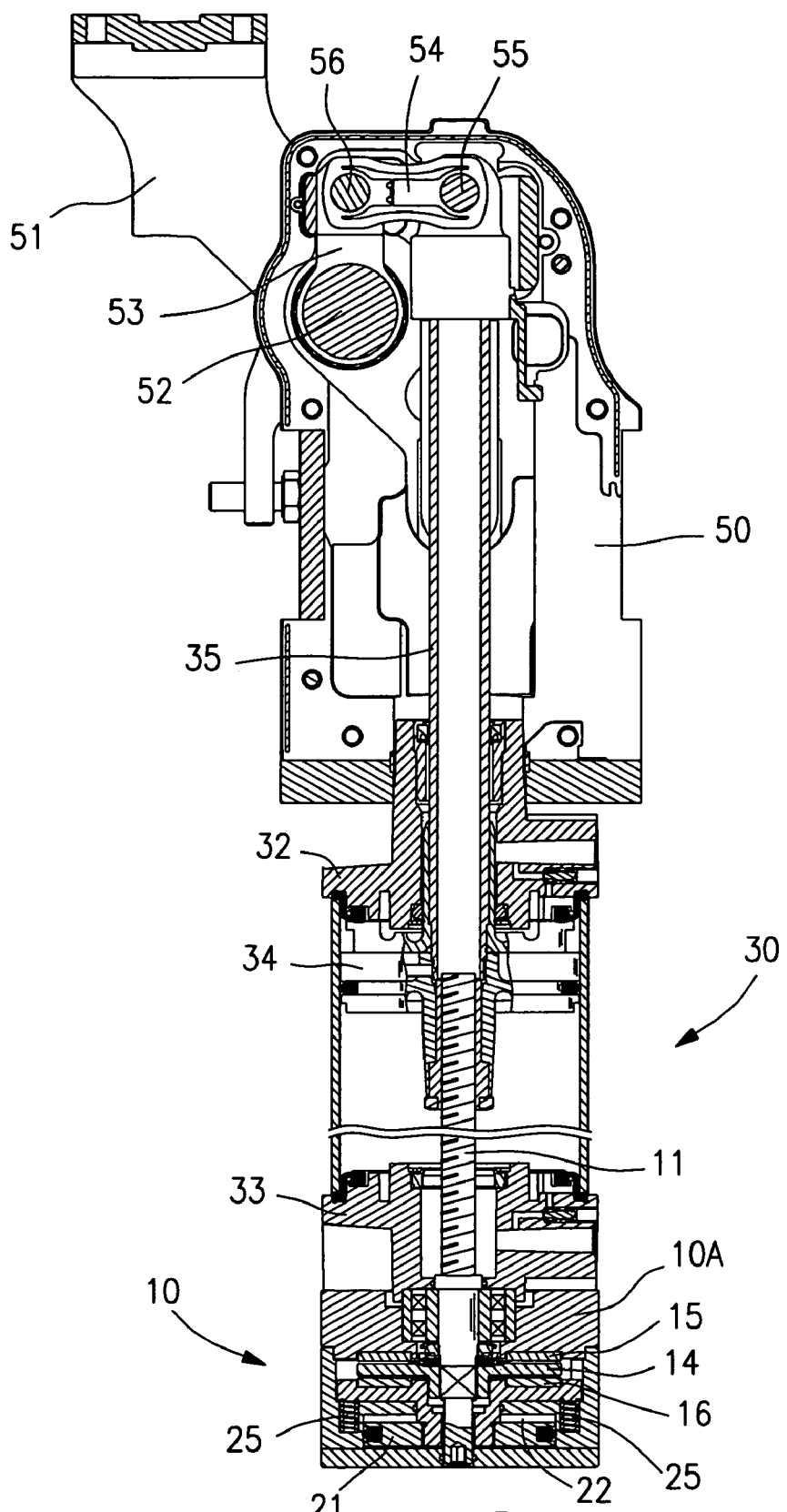
FIG. 3 shows a drive device of the swinging type, comprising a pneumatic actuator and a braking device according to the preceding figures.

The drive device having a swing arm of FIG. 3, comprising the pneumatic actuator and the self-locking braking device of the preceding FIGS. 1 and 2, proves to be suitable for this use; therefore also in FIG. 3 the same reference numbers have been used to indicate similar or equivalent parts to those of the preceding figures.

In general, in the drive devices of this kind, there is a need to control the movement of a swing arm, to which is connected the load to be moved smoothly and extremely precisely, while maintaining an accurate control of the positions, in particular during the transient periods of starting up and stopping of the movement.

The possibility of locking the load and of maintaining it locked in one or more operative positions, as well as the possibility of manual control, wherever necessary, are other requirements to be satisfied.

The swinging drive device having the self-locking braking device, according to this invention solves these problems and meets these requirements perfectly.

The drive device comprises a box-shaped body 50, having two opposite or otherwise shaped half-shells, provided with at least one pivotally supported arm 51 which can be connected to a load to be moved; the arm 51 is supported by the box-shaped body 50 by means of a rotating axle 52 at the fore end of the box-shaped body 50.

The box-shaped body 50 is mechanically secured to the pneumatic actuator 30, in such a way that the tubular rod 35 penetrates and extends inside the body 50.

The fore end of the tubular rod 35 is operatively connected to a lever arm 53 integral with or mechanically connected to the axle 52, by means of an intermediate connecting link 54, which is elastically yielding in an axial direction, and articulated in 55 and 56 at its ends. The elastic connecting link 54 is part of a toggle-lever mechanism, for example of the type illustrated in the European patent EP-B-1 250 984 activated in Italy under no. 35946BE/2004, of the same applicant, which forms an integral part of this specification.

In particular, in the case of FIG. 3, the shaft 11 and the rod 35 of the actuator are operatively connected to each other by means of a screw-nut mechanism, in which the tubular rod 35 constitutes a thrust member articulated to the elastic connecting link 54 of the toggle-lever mechanism; the thrust member, consisting of the tubular rod 35, slides axially along the box-shaped body 50 between a forward position and a backward position, coaxially to the shaft 11, causing the lowering or the raising of the swing arm 51 and the simultaneous rotation of the shaft 11. If required, the disposition of the threaded shaft 11 and of the tubular rod 35 could also be reversed with respect that shown.

From what has been described and shown in the drawings, it is evident that a self-locking braking device has been provided and several of its possible embodiments and applications capable of achieving the objects of the invention. It is understood that what has been described and shown with reference to the accompanying figures, has been given purely in order to illustrate the general features of the invention and several of its preferential embodiments; therefore other modifications or variations may be made, or other applications may be contemplated for the braking device, without thereby deviating from the scope of the claims.

I claim:

1. A self-locking braking device for rotary shafts comprising:

a support body for a rotatably supported drive shaft, the drive shaft being operatively connectable to an external load;

braking means operatable to lock, respectively to release the rotation of the drive shaft, the braking means comprising a braking member rotating with the drive shaft, the braking member being interposed between a first clutch member secured to the support body, and a second clutch member carried by an axially movable support element, the support element of the second clutch member being connected to the piston of a pneumatic cylinder; and biasing spring means between said support element for the second clutch member and the support body for the drive shaft, said biasing spring means being shaped and arranged to lock the braking member and keep it locked between said clutch members, wherein said braking member is in the form of a rigid disk conformed with friction surfaces on both sides; and wherein said braking disk is slidingly supported in an axial direction by the drive shaft, in a floating condition between the two clutch members, wherein elastically yielding spacing means are interposed between the braking member and the support body, on the side of the first clutch member.

2. An actuating unit comprising a linear pneumatic actuator, and a self-locking braking device according to claim 1, wherein said pneumatic actuator comprises:

a piston reciprocably movable in a chamber having ducts for feeding and discharging a pressurised fluid;

a tubular rod axially extending from a side of the piston; and a nut screw coaxially extending to the tubular rod, on the opposite side of the piston; and wherein the self-locking braking device comprises a threaded shaft which engages with the nut screw and which slidingly extends into the tubular rod of the piston of the actuator.

3. The actuating unit according to claim 2, wherein said actuator comprises pneumatic damping means, on at least one of its ends.

4. The actuating unit according to claim 3, wherein the pneumatic damping means comprise a nose coaxially extending from a side of the piston, and a cavity for an airtight penetration of the nose, the cavity being communicating with a duct for feeding and discharging a pressurised fluid; and wherein a throttling duct is branched between the piston chamber and said duct for feeding and discharging the pressurised fluid.

5. The actuating unit according to claim 4, wherein said branched duct comprises an adjustable throttle valve.

6. A drive device having a swing arm, comprising a pneumatic actuating unit according to claim 3, wherein said device comprises:
- a box-shaped body;
- a swing arm, rotatably supported by said box-shaped body to rotate around a pivotal axis, said swing arm being operatively connected to the piston rod of the actuator; and
- wherein the rod of the actuator is connected to said swing arm by means of a toggle-lever mechanism.

7. The drive device according to claim 6, wherein the toggle-lever mechanism comprises an elastically yielding connecting link.

8. A self-locking braking device for rotary shafts comprising:
- a support body for a rotatably supported drive shaft, the drive shaft being operatively connectable to an external load;
- braking means operatable to lock, respectively to release the rotation of the drive shaft, the braking means comprising a braking member rotating with the drive shaft, the braking member being interposed between a first clutch member secured to the support body, and a second clutch member carried by an axially movable support element, the support element of the second clutch member being connected to the piston of a pneumatic cylinder; and
- biasing spring means between said support element for the second clutch member and the support body for the drive shaft, said biasing spring means being shaped and arranged to lock the braking member and keep it locked between said clutch members,
- wherein said braking member is in the form of a rigid disk conformed with friction surfaces on both sides; and
- wherein said braking disk is slidingly supported in an axial direction by the drive shaft, in a floating condition between the two clutch members,
- wherein said drive shaft extends rearwardly to the pneumatic cylinder, ending with an end accessible from the outside, the shaft end being shaped to be engageable with a manually operated tool.

* * * * *